United States Patent
Phatak (10) Patent No.: US 11,452,147 B2
(45) Date of Patent: Sep. 20, 2022

(54) HORIZONTAL EMBEDDED ARCHITECTURE FOR SYSTEM OF SYSTEMS (SOS) AND INTERNET OF EVERYTHING (IOE)

(71) Applicant: Hitachi, Ltd., Tokyo (JP)

(72) Inventor: Sujit S. Phatak, New Hudson, MI (US)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 16/866,407

(22) Filed: May 4, 2020

(65) Prior Publication Data
US 2021/0345428 A1  Nov. 4, 2021

(51) Int. Cl.
*G06F 16/23* (2019.01)
*H04W 76/10* (2018.01)
*H04W 4/44* (2018.01)

(52) U.S. Cl.
CPC ........ *H04W 76/10* (2018.02); *G06F 16/2379* (2019.01); *H04W 4/44* (2018.02)

(58) Field of Classification Search
CPC ...... H04W 76/10; H04W 4/44; G06F 16/2379
See application file for complete search history.

(56) References Cited

U.S. PATENT DOCUMENTS

| | | | |
|---|---|---|---|
| 11,016,852 B1* | 5/2021 | Viswanathan | G06F 9/4401 |
| 2005/0222933 A1* | 10/2005 | Wesby | H04L 41/00 |
| | | | 705/36 R |
| 2017/0168472 A1 | 6/2017 | Ando et al. | |
| 2018/0160464 A1 | 6/2018 | Zhang | |
| 2019/0141536 A1* | 5/2019 | Bachmutsky | H04W 12/08 |
| 2019/0281118 A1 | 9/2019 | Kim et al. | |
| 2020/0202292 A1* | 6/2020 | Doig | G01S 5/0027 |

* cited by examiner

*Primary Examiner* — Joseph E Dean, Jr.
(74) *Attorney, Agent, or Firm* — Procopio, Cory, Hargreaves & Savitch (57) ABSTRACT

Example implementations described herein are directed to an embedded edge device and edge/cloud system configured to facilitate seamless connectivity between multi-domain assets for system of system and internet of everything applications. Through the use of a novel horizontally scalable embedded architecture for embedded edge device that can be connected to multi-domain assets to enable seamless connectivity between them, the example implementations can facilitate wireless connections across multi-domain assets to allow overall system of systems and internet of everything applications to improve quality of life.

10 Claims, 13 Drawing Sheets

HORIZONTAL EMBEDDED ARCHITECTURE FOR SYSTEM OF SYSTEMS (SOS) AND INTERNET OF EVERYTHING (IOE)

BACKGROUND

Field

The present disclosure is generally directed to system of systems (SoS) and Internet of Everything (IoE) management, and more specifically, to facilitating architecture for such systems.

Related Art

As the Internet of Things (IoT) era beings to involve multidomain products, services and systems, there will be an ever more increasing complexity and scaling for multi-domain interconnectivity and expanding ecosystems. All products are integrated into a system of systems (SoS) and will be interconnected to yield more broad and horizontally integrated applications leading to an Internet of Everything (IoE) that would enhance the overall quality of life (QoL) for society.

SUMMARY

Aspects of the present disclosure can include an apparatus configured to be hardwire connected to an asset, the apparatus involving a cellular interface (I/F); and a microcontroller, configured to, upon boot-up of the apparatus, retrieve identification information from the asset through the hardwire connection to determine a type of the asset; register the identification information with a server over the cellular I/F; and load an application corresponding to the determined type of asset.

Aspects of the present disclosure can include a system, can involve a server; and an apparatus configured to be hardwire connected to an asset, the apparatus involving a cellular interface (I/F); and a microcontroller, configured to, upon boot-up of the apparatus, retrieve identification information from the asset through the hardwire connection to determine a type of the asset; register the identification information with a server over the cellular I/F; and load an application corresponding to the determined type of asset.

Aspects of the present disclosure can include a system configured to be hardwire connected to an asset, the system involving a cellular interface (I/F); and means for, upon boot-up of the apparatus, retrieving identification information from the asset through the hardwire connection to determine a type of the asset; means for registering the identification information with a server over the cellular I/F; and means for loading an application corresponding to the determined type of asset.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. Malware and ransomware may be utilized interchangeably through the example implementations described herein.

Figure 1:
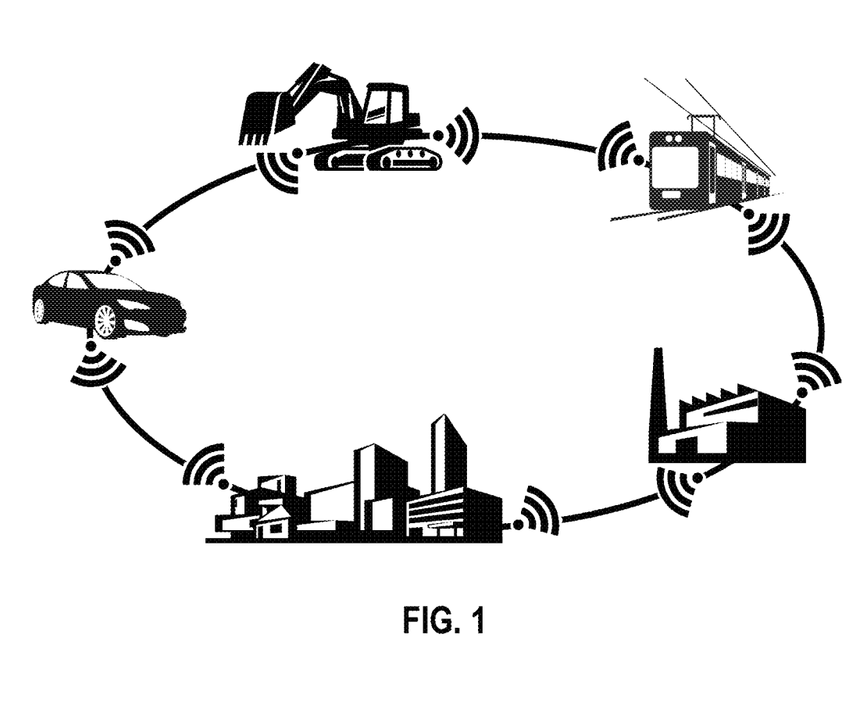
FIG. 1 illustrates an example of a connected system of systems, in accordance with an example implementation.

FIG. 1 illustrates an example of a connected system of systems, in accordance with an example implementation. In the example of FIG. 1, there are "assets" from some of the many application domains including automotive, construction machinery, railways, factory/manufacturing and infrastructure. However, such a list is not exhaustive and there could be multiple other domains that can be included, such as consumer products, agriculture machinery, weather forecasting equipment and so on. When considering each of these domains in isolation, there exists a multitude of dedicated hardware and software vendors specifically targeting connectivity related development.

There are also some custom communication protocols associated with each of these domains, which is mostly serial communication. Thus the development is scattered. If there is a need to connect any individual domain (e.g. Automotive) with a completely different domain (e.g. Infrastructure) each domain must be considered in isolation first, wherein the developer must then consider what new connectivity related challenges can occur if the completely separate domains are interfaced. Considering the hardware/software (HW/SW) toolchain associated with each domain in isolation, there exists problems related to compatibility, reliability, safety, security and inconsistency, among others. Further, there is no control over the specifications and version/updates for each domain, and the exponentially increasing issues outlined above. Example implementations described herein are directed to addressing such challenges.

Example implementations described herein are directed to horizontally scalable hardware/software architecture and prototype for an edge embedded hardware device that can be plugged in to a "gateway" or a common domain interface for a specific asset as a plug and play system, while facilitating the ability to communicate wirelessly with a similar device connected to another separate domain asset (e.g., of the same or different type). This would then allow seamless connectivity between two completely different assets—e.g. automotive and infrastructure that could then be leveraged to realize value and improve QoL. Through the example implementations described herein, the same hardware edge device would be used for interfacing with any asset with domain specific software update. Such an embedded edge device would initially relay the information it is gathering from the connected specific domain asset to a backend server, which can then relay such data to another embedded edge device connected to another domain asset.

Figure 2:
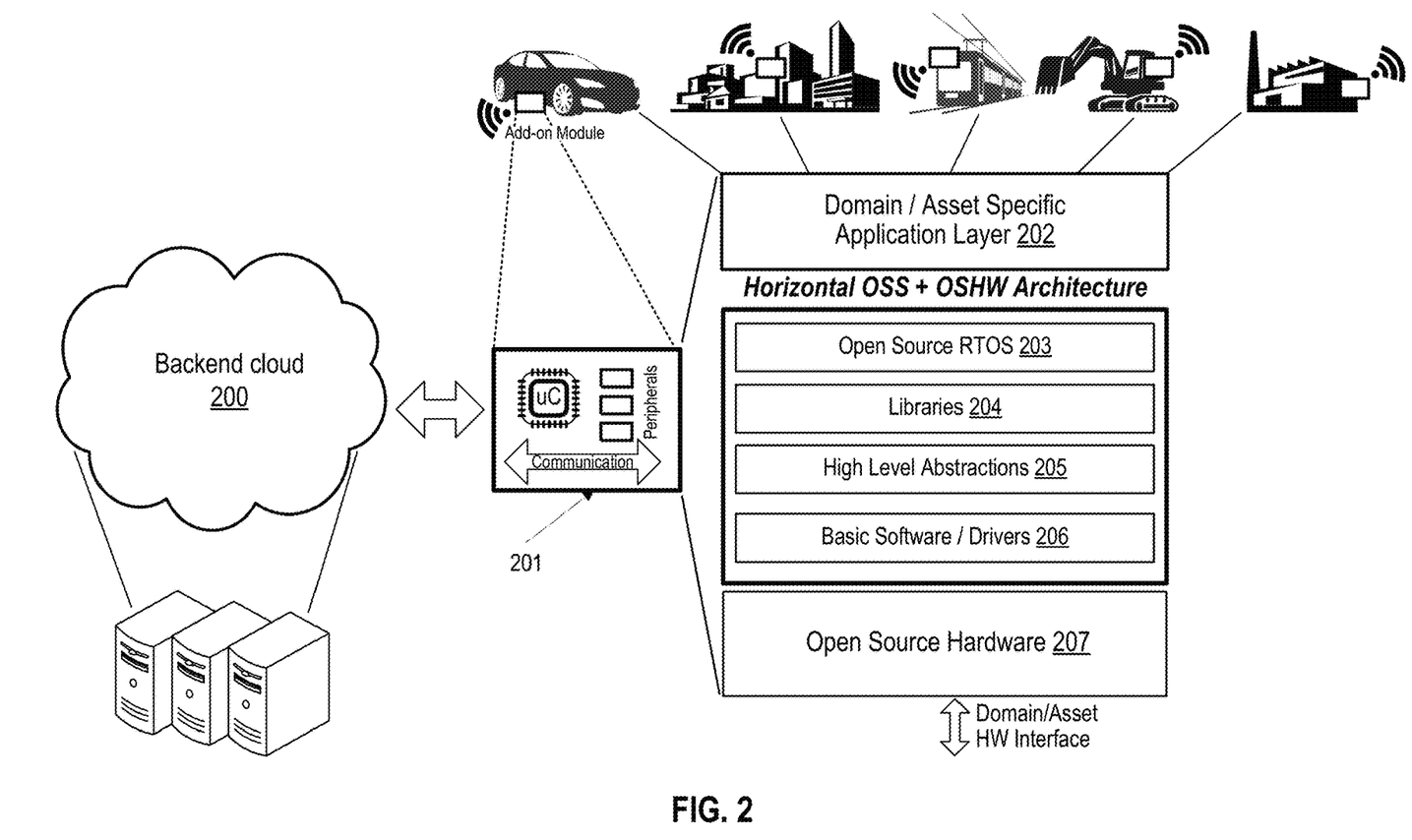
FIG. 2 illustrates a block diagram of the system, in accordance with an example implementation.

FIG. 2 illustrates a block diagram of the system, in accordance with an example implementation. In the example system, there is a backend cloud 200, a plug-n-play open source software (OSS)/open source hardware (OSHW) embedded module 201, a domain/asset specific application layer 202, and a horizontal OSS/OSHW architecture supported by OSHW 207. The OSS in the architecture can include an Open Source Real-time Operating System (RTOS) 203, libraries 204, high level abstractions 205 and basic software/drivers 206.

Backend cloud 200 is configured to facilitate over the area (OTA) updates, conduct management of data, and facilitate future services/updates depending on the desired implementation. OSHW 207 can include any type of OSHW, such as, but not limited to, RISC-V, Arduino, and Raspberry Pi.

Through leveraging on the customization of commercially available OSHW and OSS platforms, the example implementations described herein facilitate complete end-to-end ownership and maintenance of the cloud+edge ecosystem that would help alleviate the issues related to compatibility, reliability, safety, security and inconsistency between the interacting multiple domain assets.

As will be described herein, the embedded edge device will be described as well as the different implementation steps taken to realize the idea when implementing the example implementations described herein.

Figure 3:
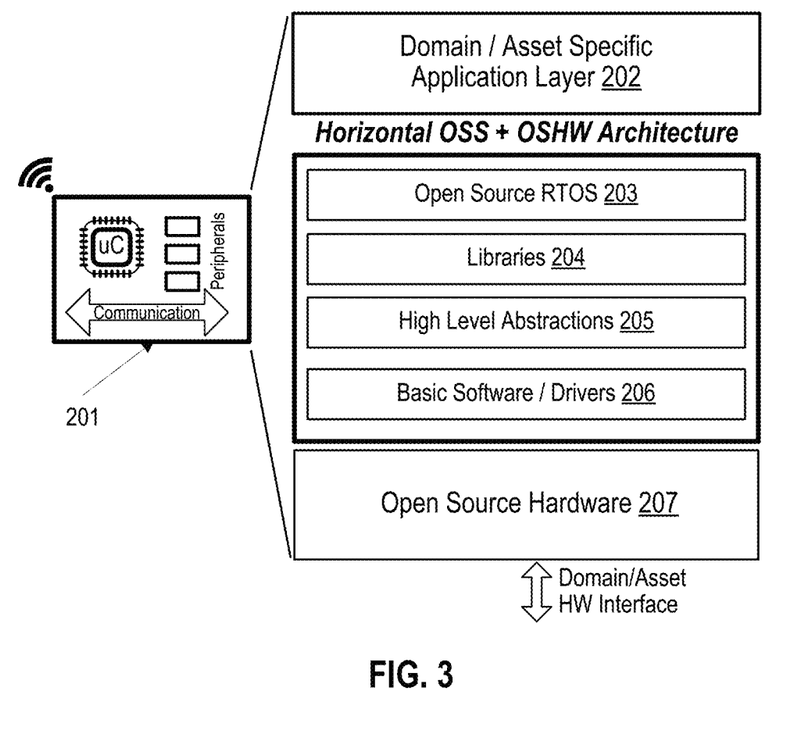
FIG. 3 illustrates the architecture of the embedded edge device, in accordance with an example implementation.

FIG. 3 illustrates the architecture of the embedded edge device, in accordance with an example implementation. The embedded edge device 201 involves a traditional embedded system with a dedicated hardware computational element such as a microcontroller and the embedded software stack implemented on the hardware to yield a standalone and self-contained device.

As shown in FIG. 3, the complete architecture is a layered stack with the hardware at the very bottom of the stock. As described in FIG. 2, examples of the OSHW 207 can include RISC-V based system, Arduino platform, and Raspberry Pi platform, which can be implemented in accordance with the desired implementation.

The edge module hardware 201 is configured to facilitate two separate communication capabilities. One type of communication involves wired, wherein the Domain/Asset HW Interface allows it to be physically wired to an asset. Another type of communication involves wireless. Although the example of FIG. 3 illustrates WiFi, example implementations are not limited to just wired Ethernet/LAN but can utilize any type of wireless communication including but not limited to WiFi, Bluetooth, Cellular 5G and so on in accordance with the desired implementation. As will be described herein, the initialization process for the hardware facilitates both wired and wireless communication capabilities and can be leveraged by the domain/asset to communicate with other domain/assets that are also wired with a similar device.

The software stack can include of basic hardware input/output (HWIO) software and device drivers 206 at the very bottom with high level abstractions 205 and libraries 204 on top of it. Over that sits the open source real time operating system (RTOS) 203 followed by the domain/asset specific application layer 202 on the very top. Through the example implementations described herein, the layers in the software stack starting from the RTOS going down to the hardware itself share many common functionalities, and the architecture can be reused and adapted to several different domains with the only significant change implemented in the application layer. Such example implementations thereby facilitate a "horizontally scalable" architecture that can be scaled across several independent domains as have been outlined previously.

The following five step process illustrates example implementations involving the embedded hardware. A multidomain connectivity between an automotive asset (car) and the infrastructure system is utilized to explain the process. However, the same approach can be exhaustively expanded to any combination of multi-domain assets including communication between the same types of assets.

Figure 4:
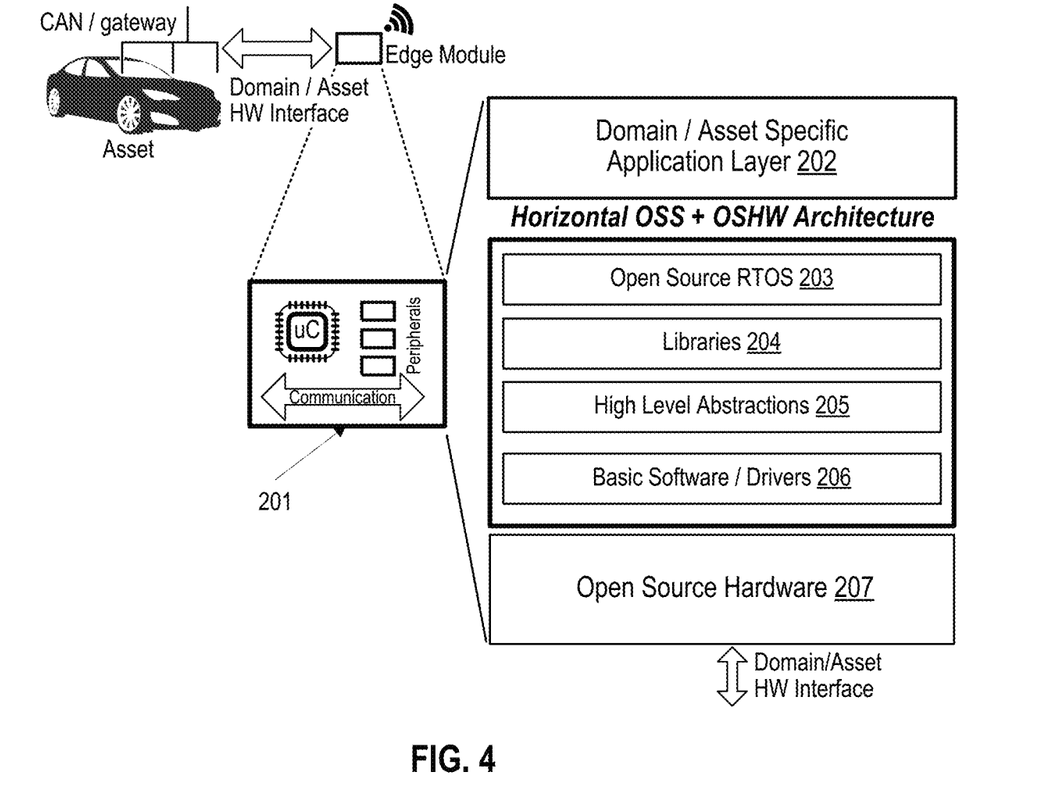
FIG. 4 illustrates an example high-level block diagram of the step of plugging the edge device into the asset.

In a first step, the edge device is plugged into the asset. FIG. 4 illustrates an example high-level block diagram of the step of plugging the edge device into the asset. Specifically, FIG. 4 illustrates the interfacing of the previously described embedded edge device to an automotive domain asset (car) via its car area network (CAN) gateway. The bidirectional (left-right) arrow shown on the top left portion of the figure near the car is the actual interface between the asset and the embedded edge device shown as a small rectangle. The bidirectional (top-down) arrow shown on the bottom right portion of the figure is shown from a conceptual point of view and for maintaining consistency with the figure of the embedded edge device architecture shown in FIG. 3.

Physical interfacing between the edge module and the asset can be achieved using hardware interface ports such as RS-232 and/or the use of necessary adapters depending on the desired implementation. As soon as the edge module is interfaced, it is powered up (drawing power from the asset interface), boots up and recognizes the asset domain (e.g., one of automotive, construction machine, railway system, infrastructure system, and so on) based on the asset recognition routine running in a loop in the edge device software stack. From here, the second step is executed.

Figure 5:
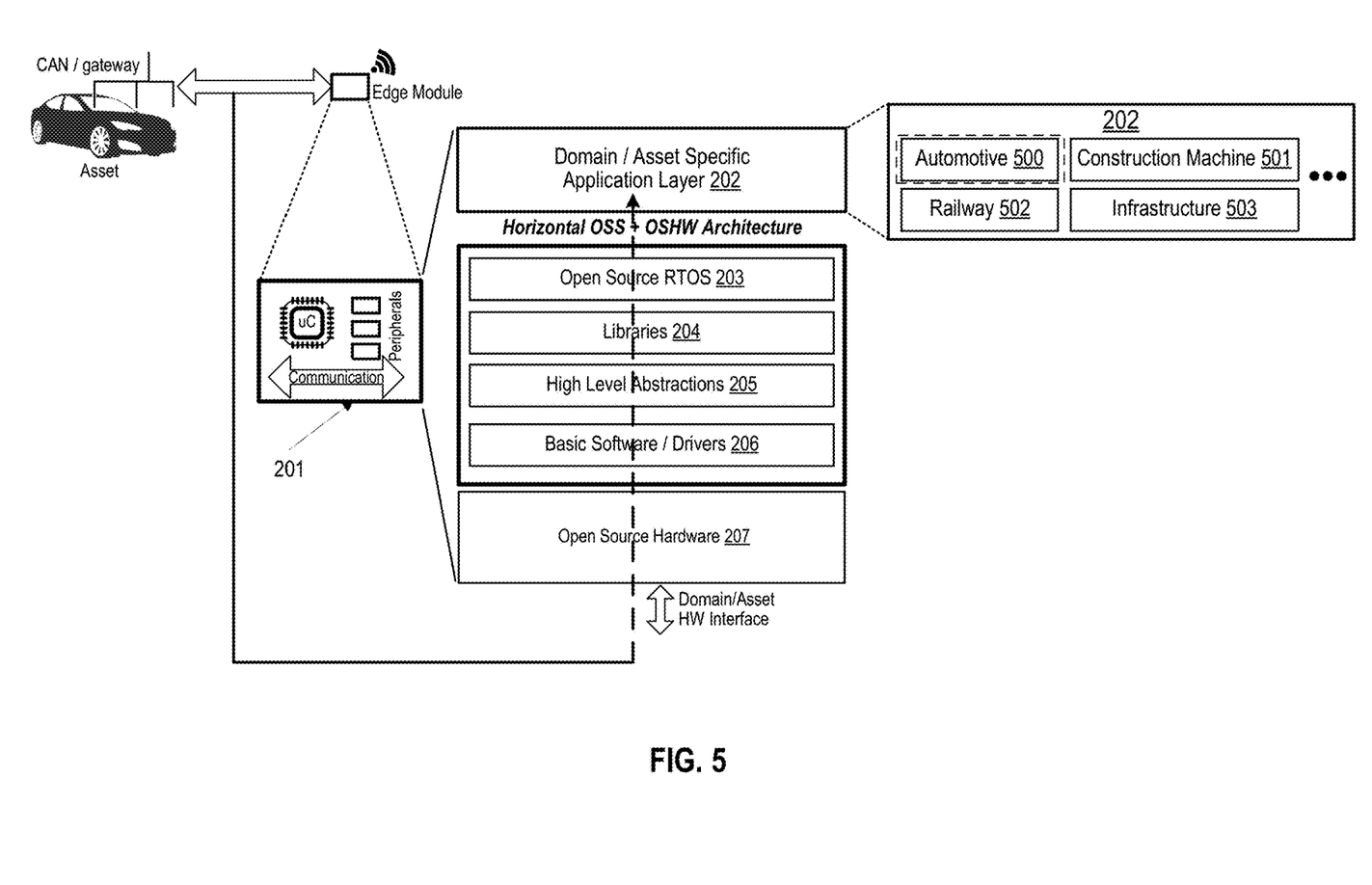
FIG. 5 illustrates an example of asset identification and edge device initialization, in accordance with an example implementation.

In the second step, there is asset identification and edge device initialization. FIG. 5 illustrates an example of asset identification and edge device initialization, in accordance with an example implementation. After bootup, the edge module can recognize the asset (e.g., automotive 500, construction machine 501, railway system 502, infrastructure system 503) based on a standard protocol handshake as described in the flowchart of FIG. 6. Based on the identified asset, the specific section of the application layer (e.g., the asset specific application as illustrated in FIG. 5) is executed to complete the initialization of the edge device and establish a seamless connection using the wireless capability.

Figure 6:
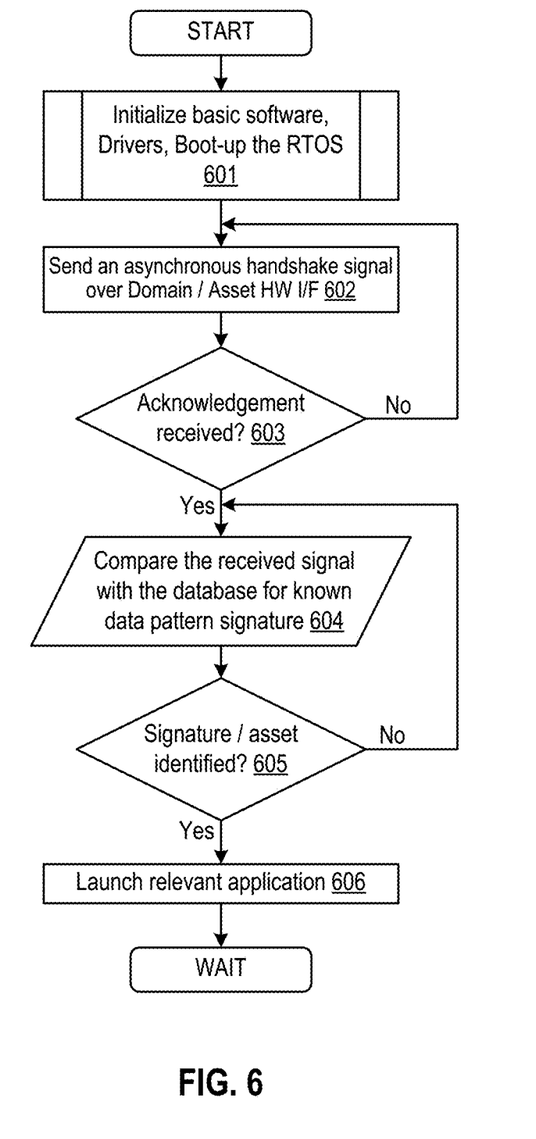
FIG. 6 illustrates an example flowchart for the initialization process, in accordance with an example implementation.

FIG. 6 illustrates an example flowchart for the initialization process, in accordance with an example implementation. At 601, the flow initializes the basic software, drivers, and boots up the RTOS. At 602, the flow sends an asynchronous handshake signal over the domain/asset HW interface (I/F). At 603, a determination is made as to whether acknowledgement is received. If so (Yes) then the flow proceeds to 604, otherwise (No) the flow proceeds back to 602.

At 604 the flow compares the received signal with the database for known data pattern signature. At 605, a determination is made as to whether the signature/asset has been identified. If so (Yes) the flow proceeds to 606 to launch the relevant application, otherwise (No) the flow proceeds to 604.

The hardwired interface is established with the supervisory control module within the asset which then acts as a gateway to submodules and components of the asset. For example, if the asset is an automotive vehicle, the edge module connects with the supervisory control module (ECU) via CAN interface (OBD2) which then facilitates access to other subcomponent ECUs in the car (e.g., engine, transmission, body electronics, etc.) as needed. Once the bootup and initialization is completed, the third step is executed.

Figure 7:
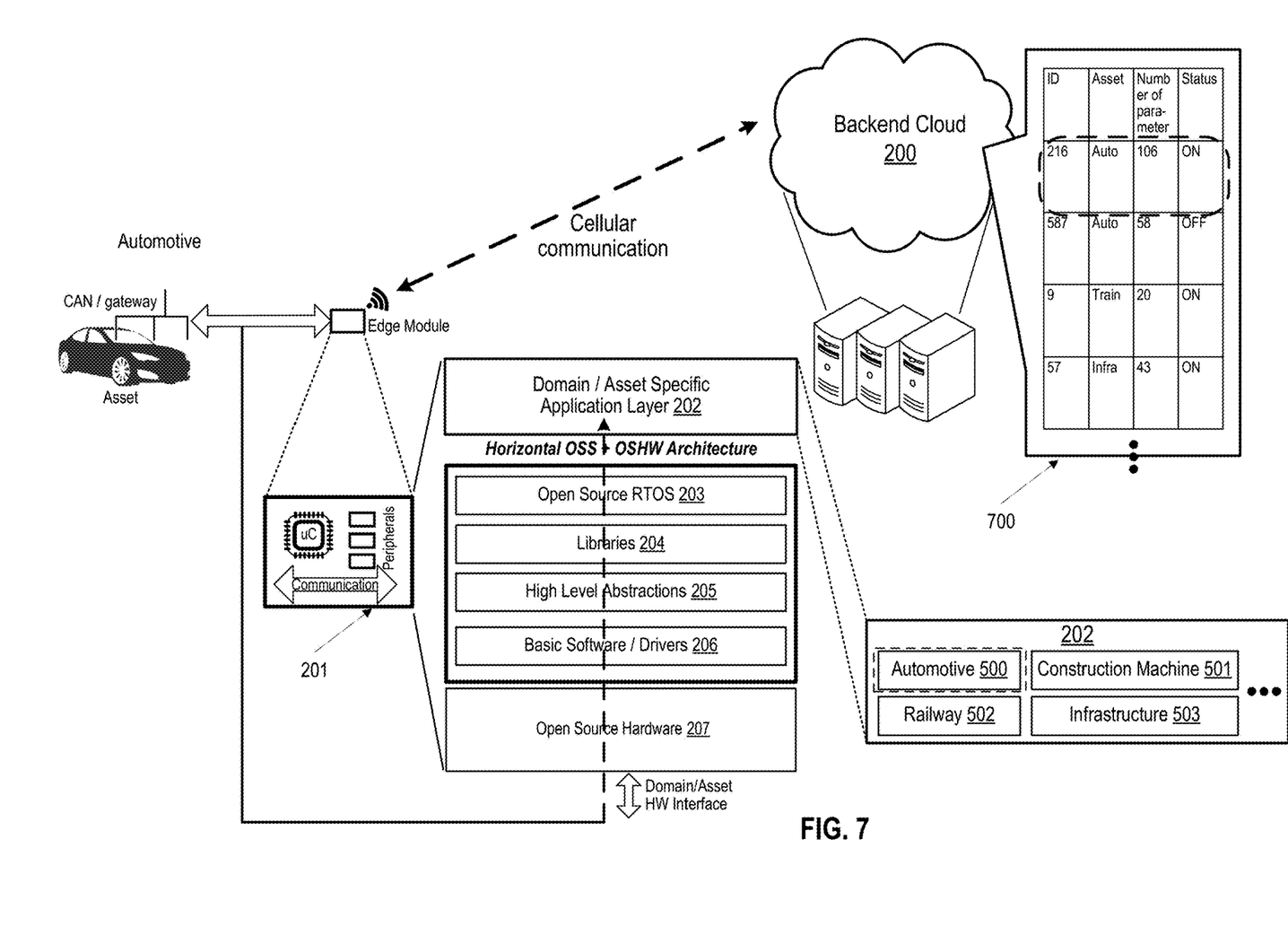
FIG. 7 illustrates an example of edge device registration and setup on the backend cloud, in accordance with an example implementation.

In a third step, the edge device registration is conducted to the backend cloud. FIG. 7 illustrates an example of edge device registration and setup on the backend cloud, in accordance with an example implementation.

After the device bootup and initialization described in the second step, the edge device in conjunction with the hardwired asset starts communicating wirelessly (e.g., using a cellular connection) with a backend cloud system 200. The backend cloud 200 is hosted on a public cloud infrastructure and conducts edge module management. The backend cloud 200 receives communication from the edge device and the edge device shares several device and asset specific details that are then stored in the cloud database. Asset specific details (e.g., automotive as illustrated in FIG. 7) may include several parameters pertaining to several ECU subsystems within the asset which are picked by specific settings in the edge device software (e.g., automotive application 500). An example implementation of the rough database structure 700 is shown. The edge device gets assigned a unique ID which can then be used for bidirectional communication to and from the backend cloud with the edge device. The registered edge device can then be pinged to for remote access and monitoring in a standalone mode as well without the need for the device to communicate with any other edge device connected to another asset.

The execution for backend server can take place in the form of two parallel executing threads (multithreaded architecture). The thread relevant to the third step is Thread 1 as shown in the flow chart of FIG. 8. Note that the "bi-directional communication between assets" part is shared between Thread 1 and Thread 2. Thread 2 is described later in the fifth step.

Figure 8:
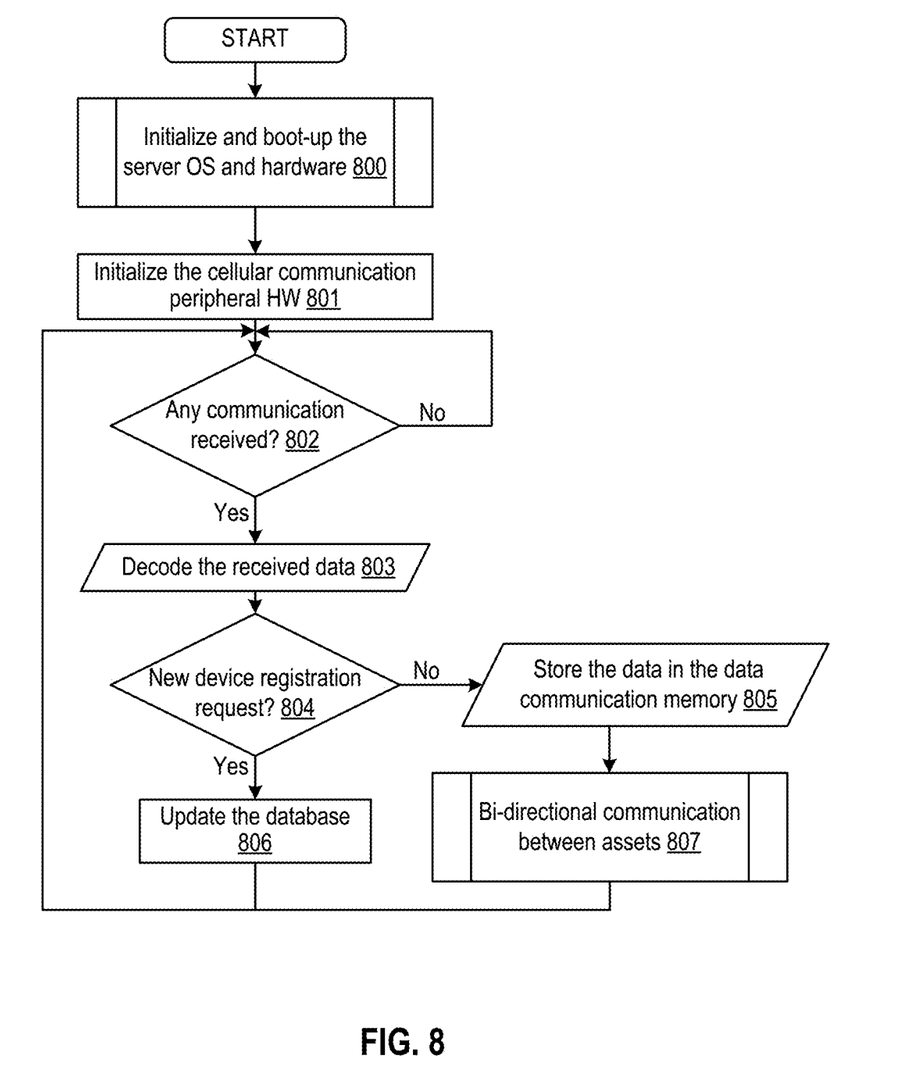
FIG. 8 illustrates an example of a flow diagram for parallel executing threads in a backend server, in accordance with an example implementation.

FIG. 8 illustrates an example of a flow diagram for parallel executing threads in a backend server, in accordance with an example implementation.

At 800, the server initializes and boots-up the server OS and hardware. At 801, the server initializes the cellular communication peripheral HW. At 802, a determination is made as to whether any communication was received. If not (No), then the flow proceeds back to 802 and iterates until a communication is received. Otherwise (Yes), the flow proceeds to 803 to decode the communication.

At 804, a determination is made as to whether the communication is a new device registration request. If so (Yes), then the flow proceeds to 806 to update the database with the new device registration. Otherwise (No), the flow proceeds to 805 to store the data in the data communication memory, whereupon the server facilitates bi-directional communication between assets at 807.

Figure 9:
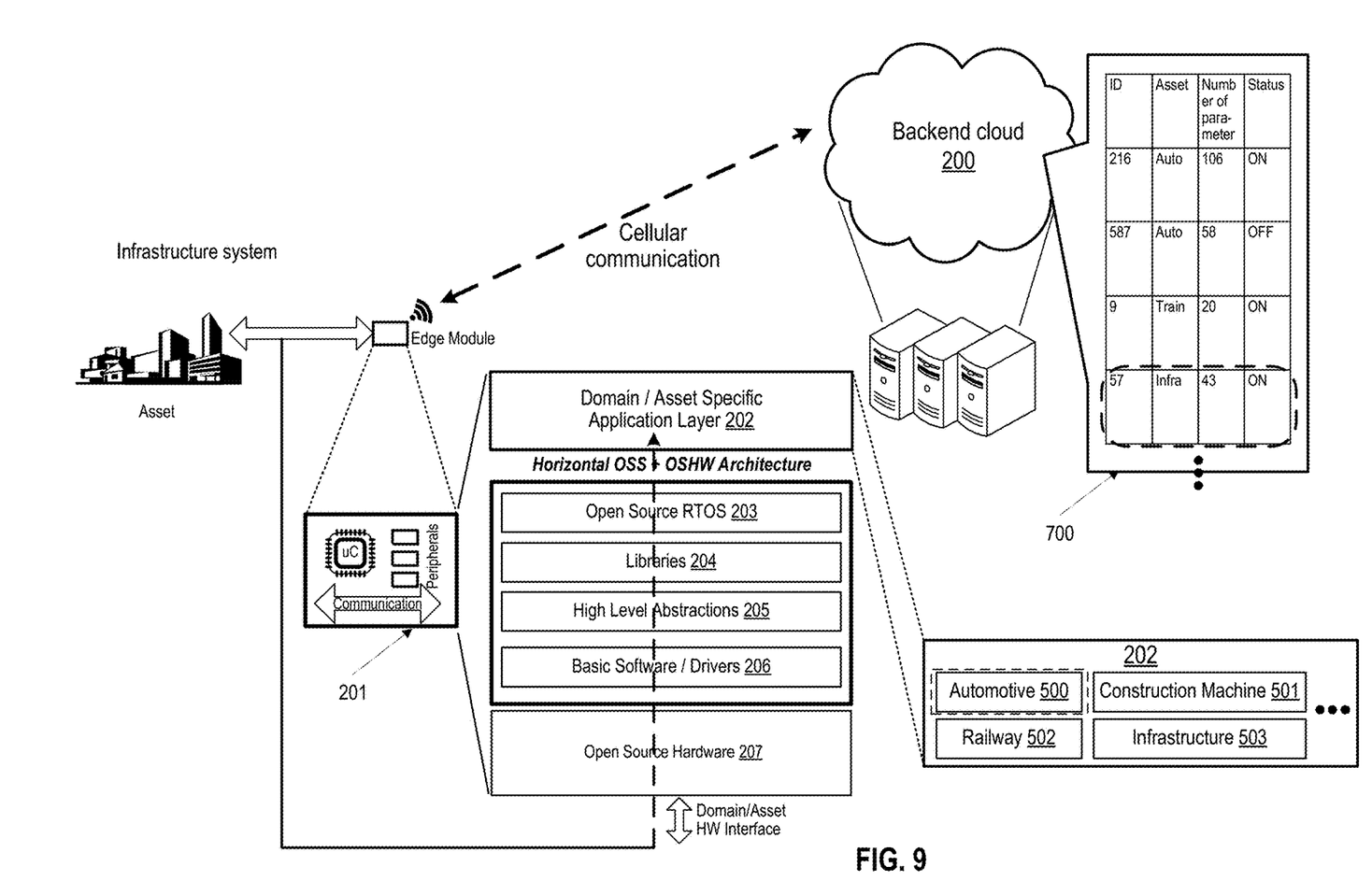
FIG. 9 illustrates an example block diagram for the edge device registration for a subsequent asset, in accordance with an example implementation.

In the fourth step, there is an edge device registration on backend cloud for a second asset. FIG. 9 illustrates an example block diagram for the edge device registration for a subsequent asset, in accordance with an example implementation. As was described for the previous asset, when the edge device is interfaced with another domain asset (e.g., infrastructure system), it gets booted up and initialized with the infrastructure system application 503 executing from the application software layer 202 and the device then seamlessly communicates using cellular communication with the backend cloud 200 to move on with its own registration. Once registration is done, it is in standby to communicate with any other asset via the backend cloud 200. This is shown in FIG. 9 with the new entry now updated in the cloud database 700 for the infrastructure system. With at least two same or different domain assets in the database, the backend cloud facilitates seamless cellular connectivity between the related assets (in conjunction with their respective edge devices) in real-time. This is shown in the fifth step as described below.

Figure 10:
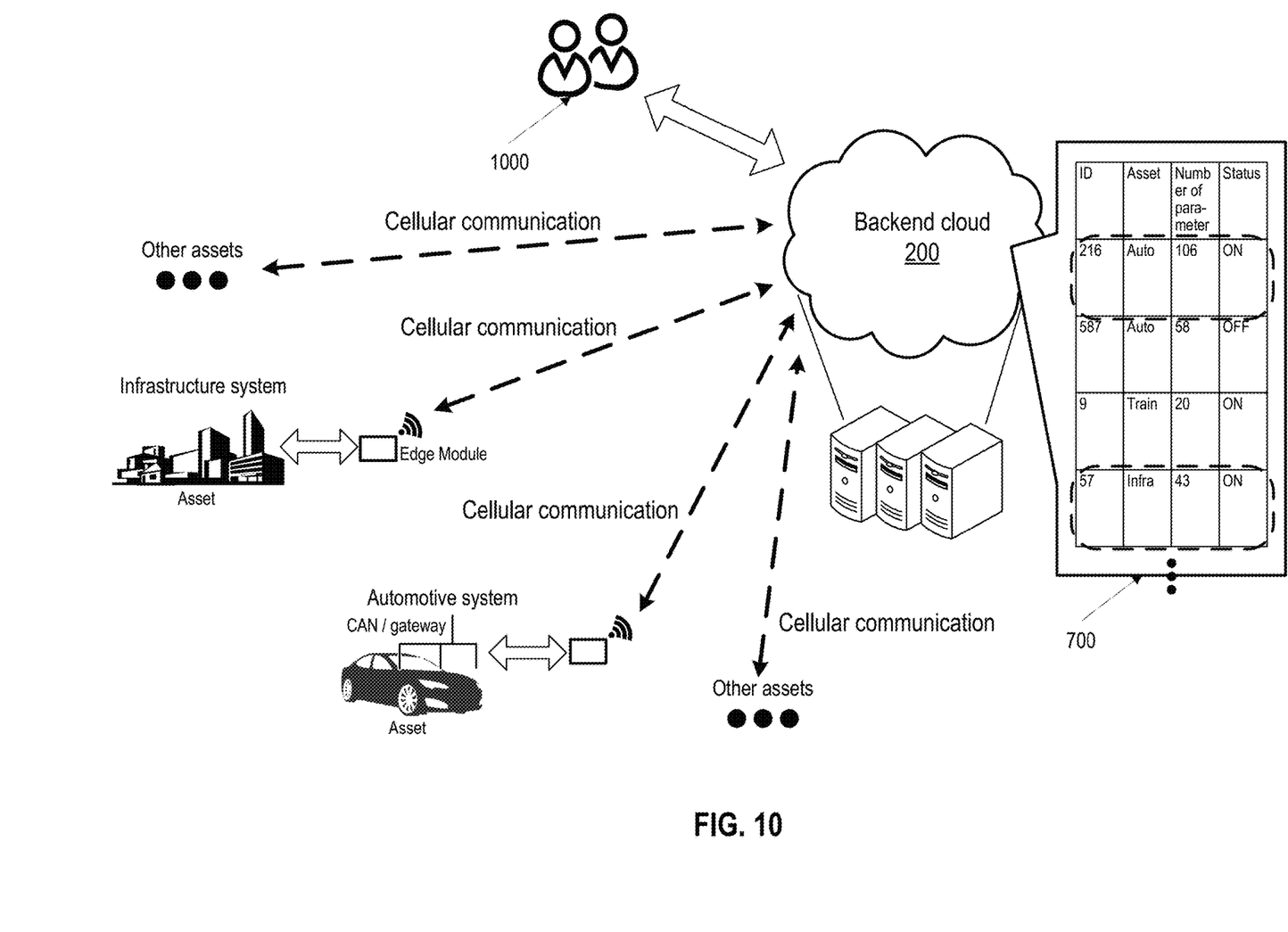
FIG. 10 illustrates an example of inter-asset seamless cellular communication via backend cloud, in accordance with an example implementation.

FIG. 10 illustrates an example of inter-asset seamless cellular communication via backend cloud, in accordance with an example implementation. As shown FIG. 10 with at least two edge devices (in conjunction with their respective assets) registered on the backend cloud, bidirectional seamless cellular connectivity can be facilitated between the respective assets. Further, such a system can be accessible with a third party 1000 such as a government, regulators, and so on who wish to leverage multi-domain communication and system of system concept.

Figure 11:
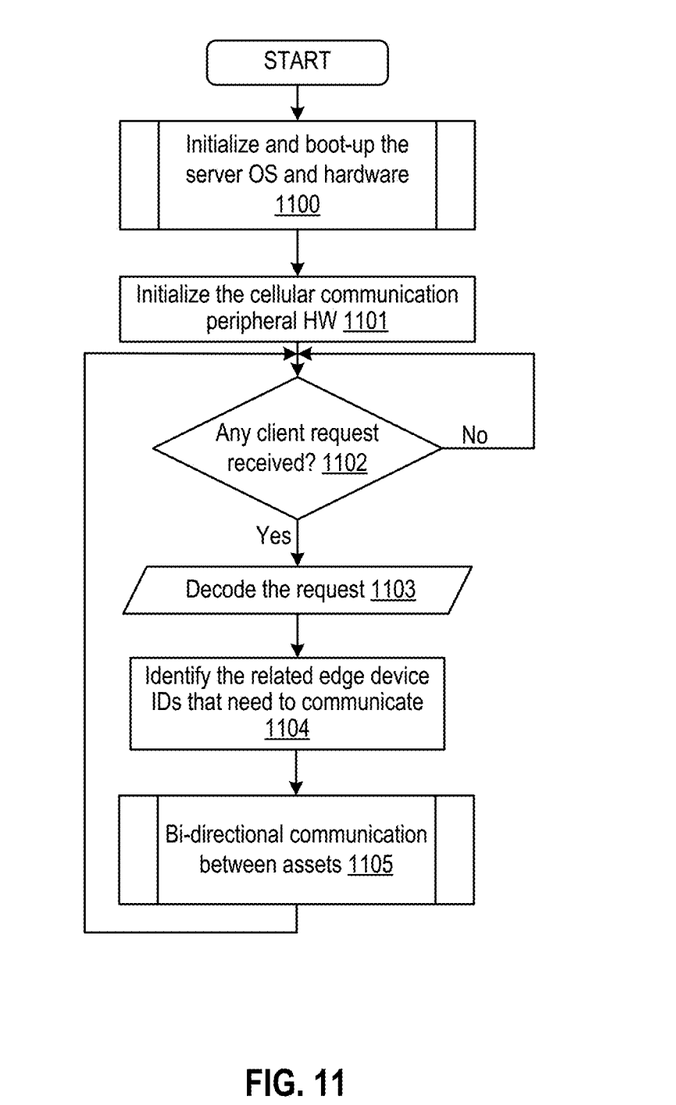
FIG. 11 illustrates an example execution of the flowchart for Thread 2, in accordance with an example implementation.

FIG. 11 illustrates an example execution of the flowchart for Thread 2, in accordance with an example implementation. At 1100, the flow initializes and boots-up the server OS and hardware. At 1101, the flow initializes the cellular communication peripheral HW. At 1102, a determination is made as to whether any client request was received. If not (No), the process iterates to 1102 until a client request was received. Otherwise (Yes), the flow proceeds to 1103 to decode the request. At 1104, the flow identifies the related edge device IDs that need to communicate with each other. At 1105, the server then facilitates the bi-directional communication between assets.

It must be noted that the "Bi-directional communication between assets" pre-defined process in the flowcharts for Thread 1 and Thread 2 includes several sub parts including but not limited to branching off multiple threads in order to service multiple clients at the same time, handling synchronization between the incoming client requests, availability of the necessary edge devices and resource management for the multiple edge device communication in case same edge devices are shared by multiple clients in the worst case. The type of communication or the particulars of the use of the multiple edge device (in conjunction with the connected assets) is implemented in accordance with the desired implementation.

In an example of the type of communication, one example can include a traffic light system in the infrastructure communicating with an automotive vehicle regarding the time left for a specific traffic light to change its state. This information can then be utilized by the automotive system to optimize its engine parameters in preparation to stop (for an upcoming green to red transition) or to get ready to go (for an upcoming red to green transition). This optimization can help save fuel and reduce CO2 emissions. Any third-party company, government, regulators or others who wish to leverage this multi-domain asset interconnectivity to realize a specific goal can utilize the example implementations described herein.

Figure 12:
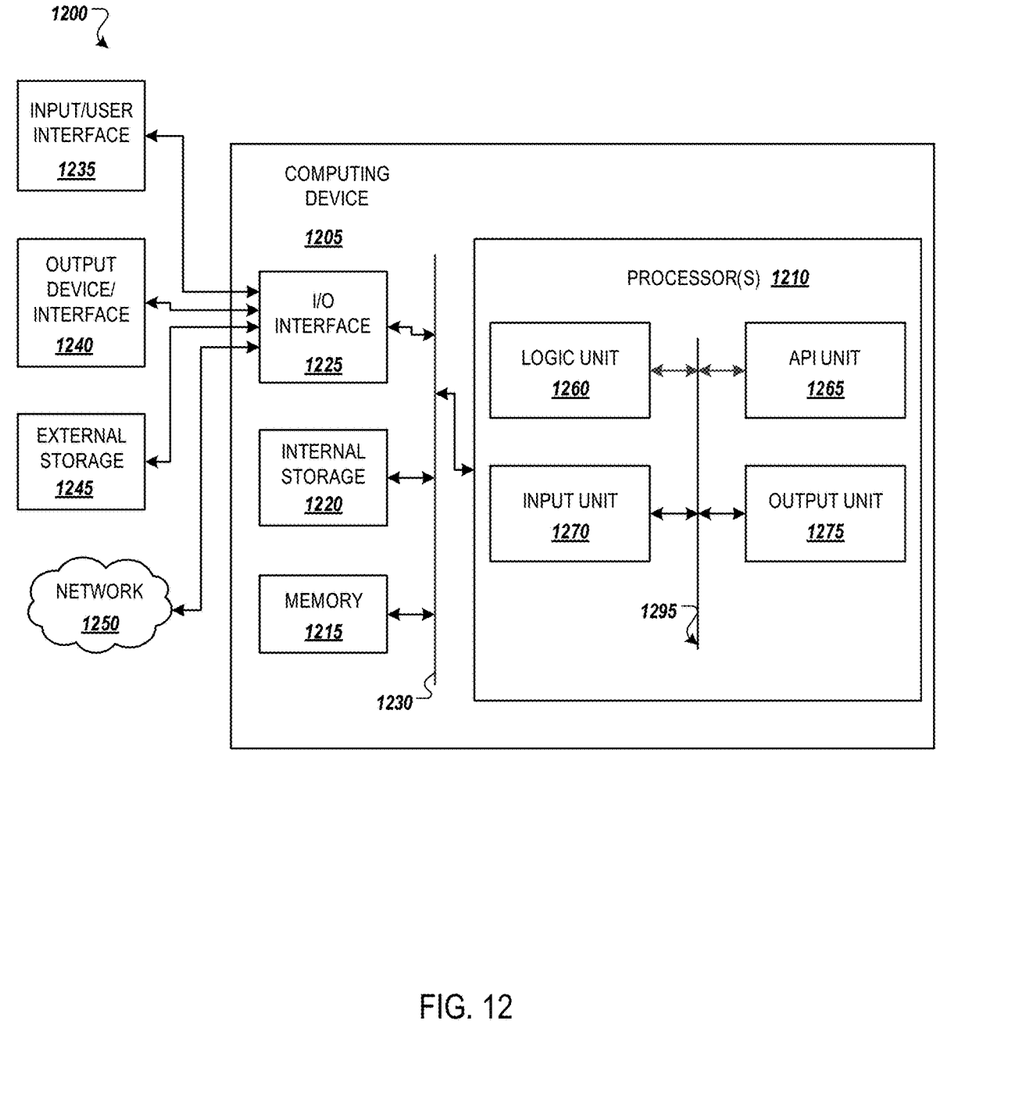
FIG. 12 illustrates an example computing environment with an example computer device suitable for use in some example implementations.

FIG. 12 illustrates an example computing environment with an example computer device suitable for use in some example implementations, such as a backend server configured to provide backend cloud functionality. Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

Memory 1215 can be configured to manage registration information from edge devices regarding the identification of the underlying type.

Processor(s) 1210 can be configured to transmit instructions over a cellular I/F to an edge device regarding the type of asset, and facilitate the processes as illustrated in FIGS. 8 and 11. As illustrated in FIGS. 7-11, the backend server can be configured to register multiple assets to a database and establish cellular communication between the asset and other ones of the multiple assets through use of the processor(s) 1210 and the memory 1215.

Figure 13:
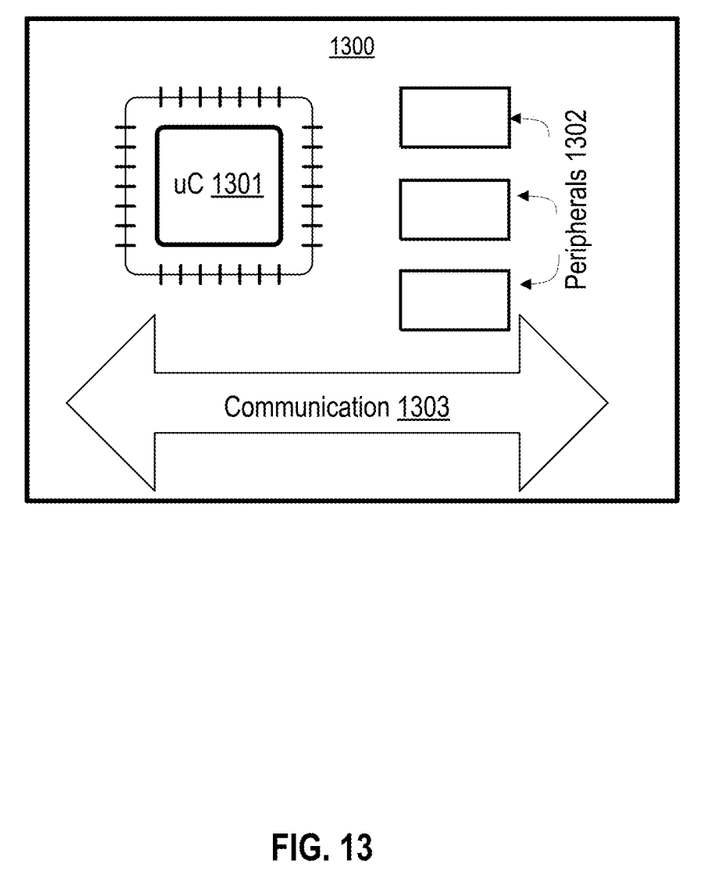
FIG. 13 illustrates an example block diagram of the edge device, in accordance with an example implementation.

FIG. 13 illustrates an example block diagram of the edge device, in accordance with an example implementation. In an example implementation, the edge device 1300 or edge module as described herein is an apparatus that can involve a microcontroller 1301, peripherals 1302, and a communication I/F 1303.

Microcontroller 1301 can be configured to facilitate the functionality of the application layer 202 as illustrated in FIG. 1 and the architecture stack required to facilitate the architecture as illustrated at 203-206 of FIG. 2 as well as the applications corresponding to various types of assets as illustrated at 500-503 of FIG. 5. Microcontroller 1301 can be configured to execute the functions as illustrated in FIG. 6.

Peripherals 1302 can include various hardware connectors to facilitate a physical hardwire connection between the edge device and the underlying asset, Such connectors can include, but are not limited, Universal Serial Bus (USB) ports, serial ports, outlet connector (e.g., cigarette power outlet, other power outlet), card edge connectors, right angle connectors, and so on depending on the desired implementation.

Communication I/F 1303 can include interfaces for facilitating the hardwire connection and communication between the edge device 1300 and the underlying asset, and can also involve a cellular I/F to facilitate cellular communications between the edge device 1300 and the backend server. Through such an interface, the edge device 1300 can receive instructions from server through the cellular I/F, which can then be provided in the form of instructions to the underlying asset through the hardwire connection.

Microcontroller 1301 can be configured to execute functionality of FIGS. 5-8 such that, upon boot-up of the edge device 1300, the microcontroller 1301 is configured to retrieve identification information from the asset through the hardwire connection to determine a type of the asset; register the identification information with a server over the cellular I/F; and load an application corresponding to the determined type of asset.

Microcontroller 1301 is configured to determine the type of asset by transmitting a handshake signal to the asset through the hardwire connection; and upon receiving an acknowledgement from the asset, comparing the acknowledgement to a database associating acknowledgements to types of assets to determine the type of asset corresponding to the acknowledgment as illustrated in FIG. 6.

As illustrated in FIG. 10, the microcontroller 1301 can be configured to communicate to another asset through the cellular I/F connection with the server. The server thereby facilitates bi-directional communication between edge devices through the cellular I/F. Further, as illustrated in FIG. 10, the another asset can be the same type of asset (e.g., vehicle to another vehicle), or can be between different types of assets (e.g., vehicle and infrastructure system).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus configured to be hardwire connected to an asset, the apparatus comprising:
   a hardwire interface configured to connect to the asset, wherein the asset is an asset of an application domain independent of the apparatus;
   a cellular interface (I/F);
   a microcontroller, configured to:
      after boot-up of the apparatus:
         retrieve asset identification information from the asset through the hardwire interface connection;
         determine a type of the asset from the retrieved asset identification information;
         register the retrieved asset identification information with a server over the cellular I/F;
         load an application corresponding to the determined type of asset; and
         communicate to another asset through the cellular I/F connection with server to establish bi-directional communication between the asset and the another asset.

2. The apparatus of claim 1, wherein the server is configured to register multiple assets to a database and establish cellular communication between the asset and other ones of the multiple assets.

3. The apparatus of claim 1, wherein the another asset is another type of asset that is different from the determined type of asset.

4. The apparatus of claim 1, wherein the asset is a vehicle and the another asset is an infrastructure system.

5. The apparatus of claim 1, wherein the microcontroller is configured to determine the type of asset by:
   transmitting a handshake signal to the asset through the hardwire connection; and
   upon receiving an acknowledgement from the asset, comparing the acknowledgement to a database associating acknowledgements to types of assets to determine the type of asset corresponding to the acknowledgment.

6. A system, comprising:
   a server; and
   an apparatus configured to be hardwire connected to an asset, wherein the asset is an asset of an application domain independent of the apparatus, the apparatus comprising:
      a hardware interface configured to connect to the asset;
      a cellular interface (I/F);
      a microcontroller, configured to:
         after boot-up of the apparatus:
            retrieve asset identification information from the asset through the hardwire interface connection;
            determine a type of the asset from the retrieved asset identification information;
            register the retrieved asset identification information with a server over the cellular I/F;
            load an application corresponding to the determined type of asset; and
            communicate to another asset through the cellular I/F connection with server to establish bi-directional communication between the asset and the another asset.

7. The system of claim 6, wherein the server is configured to register multiple assets to a database and establish cellular communication between the asset and other ones of the multiple assets.

8. The system of claim 6, wherein the another asset is another type of asset that is different from the determined type of asset.

9. The system of claim 6, wherein the asset is a vehicle and the another asset is an infrastructure system.

10. The system of claim 6, wherein the microcontroller is configured to determine the type of asset by:
    transmitting a handshake signal to the asset through the hardwire connection; and
    upon receiving an acknowledgement from the asset, comparing the acknowledgement to a database associating acknowledgements to types of assets to determine the type of asset corresponding to the acknowledgment.

* * * * *